Patented Feb. 21, 1933

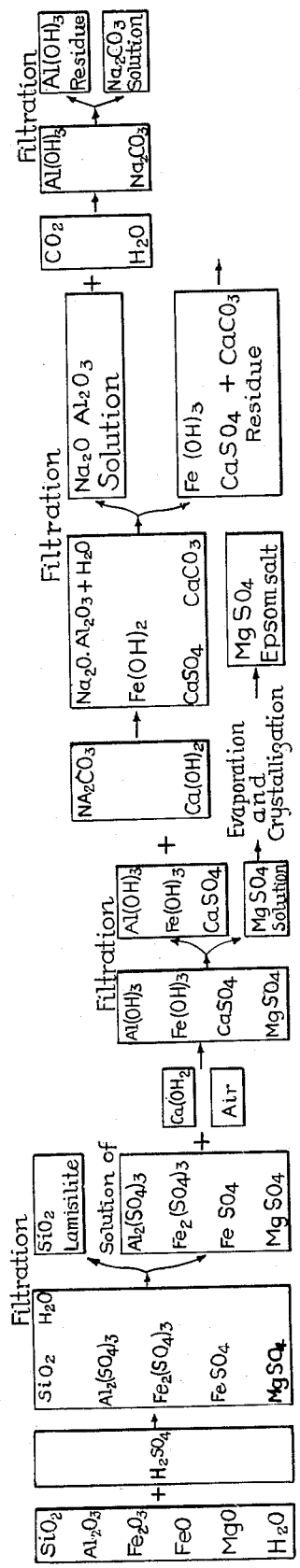

1,898,830

UNITED STATES PATENT OFFICE

ROBERT G. GUTHRIE AND OSCAR J. WILBOR, OF CHICAGO, ILLINOIS, ASSIGNORS TO WILLIAM J. MOHR, OF CHICAGO, ILLINOIS

TREATMENT OF LIQUOR RESULTING FROM RECOVERY OF LAMISILITE FROM VERMICULITE ORE

Application filed December 14, 1931. Serial No. 581,056.

A flow sheet showing a prefered practice of the novel and improved process accompanies this specification.

To produce substantially pure silica in plate or flake form from vermiculite, which occurs in nature in a variety of modes, such mineral or ore may be treated with acid, preferably sulphuric acid, such method forming the subject-matter of our co-pending patent application, Serial No. 511,436.

Such plate or flake like, shiny silicon dioxide we have designated by the term "lamisilite".

The residual liquor remaining after the chemical treatment of the mineral vermiculite with sulphuric acid contains principally ferrous and ferric sulphate, aluminum sulphate and magnesium sulphate, and the lamisilite, after having been released by the solution of these other materials from its surfaces by the action of the sulphuric acid in the production of the specified sulphates, is separated by filtration.

The compounds in the remaining liquor cannot be economically isolated or segregated by simple, fractional crystallization, because of the relative low price available for the final products, but we have overcome this difficulty by the discovery of a new and comparatively cheap way of obtaining the desired result.

The separation or segregation of the magnesium sulphate is based on the following reactions:

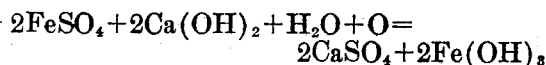

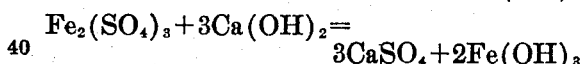

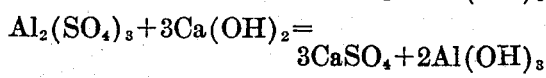

An aqueous solution of the different iron and aluminum sulphates gives an acid reaction.

In order to separate the magnesium sulphate, the specified residual liquor containing the plurality of sulphates is heated to the boiling point and stirred thoroughly by the introduction of air which oxidizes the ferrous compounds to ferric compounds.

Finely divided calcium oxide in water in the proportion of about one part of calcium oxide to five to ten parts by weight of water is added slowly to the solution, the water acting as a carrier for the calcium oxide.

The efficiency of the reaction depends upon the grain-size and the good distribution of the calcium oxide, because larger lumps of the same would soon be covered with calcium sulphate.

The progress of the reaction can be easily checked and terminated because, as soon as the sulphates of iron and aluminum are precipitated as hydroxides, the solution turns neutral and an excess of the calcium oxide makes it basic.

In place of the calcium oxide, any alkaline compound may be used which will form an insoluble sulphate, and, therefore, calcium carbonate, dolomite, burned dolomite, and so forth, can be used, but it is seemingly necessary that the products forming the water-insoluble sulphates be very finely powdered.

The products of this reaction will be a solution of magnesium sulphate and a precipitate of aluminum hydroxide and iron hydroxide mixed with calcium sulphate (when a calcium compound has been used for neutralization) and more or less excess of the added oxide or carbonate.

The precipitate is filtered out of the liquid and then the latter is evaporated to obtain the magnesium sulphate.

After the specified removal of the precipitate from the solution of magnesium sulphate, a second separation is required for the production of aluminum hydroxide and this is effected in accordance with the following reactions:

$$Ca(OH)_2 + Na_2CO_3 + 2Al(OH)_3 = CaCO_3 + Na_2AlO_4 + 4H_2O$$
$$Na_2AlO_4 + CO_2 + H_2O = Na_2CO_3 + 2Al(OH)_3$$

Such precipitate of iron and aluminum hydroxides (carrying some calcium sulphate when calcium compounds were used for the magnesium sulphate separation) is finely divided in boiling water and a slight excess of calcium hydroxide and sodium carbonate, or potassium carbonate, is added while the liquid is being stirred with air.

Instead of the calcium hydroxide and the sodium or potassium carbonate, sodium hydroxide or potassium hydroxide may be used as a substitute, it merely being necessary to employ an alkaline hydroxide or materials which will produce such in the solution.

The amount of such chemicals employed should be determined by an analysis of the precipitate of iron and aluminum hydroxide, and the equivalent of the alkaline hydroxide should be used to form the corresponding aluminate.

The sodium aluminate thus produced in accordance with the above-noted reaction being soluble in water is in solution in the water which contains an insoluble residue of a mixture of iron hydroxide, calcium sulphate, or other compounds, depending on the manner in which the magnesium sulphate was separated.

The next step in the process is to remove the sodium aluminate from the insoluble residue, and this is accomplished by filtration which leaves the insoluble residue in the filter and the sodium aluminate solution free from insoluble compounds.

The succeeding step in the operation is to precipitate the sodium aluminate from such solution, and this is accomplished by passing through it a current of carbon dioxide until no further precipitation occurs, the precipitate being pure aluminum hydroxide insoluble in water.

We have then a solution of sodium carbonate and a residue or precipitate of aluminum hydroxide which may be separated out by ordinary filtration, the sodium carbonate solution being used for a continuance of the process.

It is to be understood that this entire process can be carried on cold, but it is preferable to perform it in a hot solution.

The invention, as defined by the appended claims, as will be understood by those skilled in the art, is susceptible of various methods of practice and is not necessarily limited to the details herein presented.

If desired, the process may be stopped with the production of the sodium aluminate without resorting to the conversion of such into aluminum hydroxide.

We claim:
1. The process of treating a vermiculite with sulphuric acid thereby producing substantially-pure silica in the form of flat plates or flakes in a solution containing principally ferrous and ferric sulphates, aluminum sulphate and magnesium sulphate, filtering out the silica, substantially neutralizing the solution with an alkaline base capable of producing an insoluble sulphate thereby causing a precipitation of iron and aluminum hydroxides, separating such precipitate from the solution, and recovering the magnesium sulphate from the solution.

2. The process of treating a vermiculite with sulphuric acid thereby producing substantially-pure silica in the form of flat plates or flakes in a solution containing principally ferrous and ferric sulphates, aluminum sulphate and magnesium sulphate, filtering out the silica, substantially neutralizing the solution with an alkaline base capable of producing an insoluble sulphate thereby causing a precipitation of iron and aluminum hydroxides, separating such precipitate from the solution, and evaporating such solution to recover the magnesium sulphate therefrom.

3. The process of treating a vermiculite with sulphuric acid thereby producing substantially-pure silica in the form of flat plates or flakes in a solution containing principally ferrous and ferric sulphates, aluminum sulphate, and magnesium sulphate, filtering out the silica, substantially neutralizing the solution with a finely-divided alkaline base capable of producing an insoluble sulphate and distributed in water as a carrier, thereby causing a precipitation of iron and aluminum hydroxides, separating such precipitate from the solution, and recovering the magnesium sulphate from the solution.

4. The process of treating a vermiculite with sulphuric acid thereby producing substantially-pure silica in the form of flat plates or flakes in a solution containing principally ferrous and ferric sulphates, aluminum sulphate, and magnesium sulphate, filtering out the silica, substantially neutralizing the solution with a finely-divided alkaline base capable of producing an insoluble sulphate and distributed in boiling water as a carrier, thereby causing a precipitation of iron and aluminum hydroxides, separating such precipitate from the solution, and recovering the magnesium sulphate from the solution.

5. The process of treating a vermiculite with sulphuric acid thereby producing substantially-pure silica in the form of flat plates or flakes in a solution containing principally ferrous and ferric sulphates, aluminum sulphate, and magnesium sulphate, filtering out the silica, substantially neutralizing the solution with a finely-divided base capable of producing an insoluble sulphate and distributed in boiling water as a carrier, agitating the liquid with air during such neutralization, thereby causing a precipitation of iron and aluminum hydroxides, separating such precipitate from the solution, and recovering the magnesium sulphate from the solution.

6. The process of treating a vermiculite with sulphuric acid thereby producing substantially-pure silica in the form of flat plates or flakes in a solution containing principally ferrous and ferric sulphates, aluminum sulphate, and magnesium sulphate, filtering out the silica, substantially neutralizing the solution with finely-divided calcium oxide distributed in water as a carrier, thereby causing a precipitation of iron and aluminum hydroxides, separating such precipitate from the solution and recovering the magnesium sulphate from the solution.

7. The process of treating a vermiculite with sulphuric acid thereby producing substantially-pure silica in the form of flat plates or flakes in a solution containing principally ferrous and ferric sulphates, aluminum sulphate, and magnesium sulphate, filtering out the silica, substantially neutralizing the solution with finely-divided calcium oxide distributed in boiling water acting as a carrier, agitating the liquid with air during such neutralization, thereby causing a precipitation of iron and aluminum hydroxides, separating such precipitate from the solution, and recovering the magnesium sulphate from the solution.

8. The process of treating a vermiculite with sulphuric acid thereby producing substantially-pure silica in the form of flat plates or flakes in a solution containing principally ferrous and ferric sulphates, aluminum sulphate and magnesium sulphate, filtering out the silica, substantially neutralizing the solution with an alkaline base capable of producing an insoluble sulphate thereby causing a precipitation of iron and aluminum hydroxides, separating such precipitate from the solution, finely dividing said precipitate in water, adding thereto an equivalent amount of an alkaline hydroxide to form the corresponding aluminate, separating the solution of sodium aluminate from the insoluble residue formed, passing carbon dioxide through such solution until precipitation of insoluble aluminum hydroxide substantially ceases, and then separating such aluminum hydroxide from the liquid.

9. The process of treating a vermiculite with sulphuric acid thereby producing substantially-pure silica in the form of flat plates or flakes in a solution containing principally ferrous and ferric sulphates, aluminum sulphate and magnesium sulphate, filtering out the silica, substantially neutralizing the solution with an alkaline base capable of producing an insoluble sulphate thereby causing a precipitation of iron and aluminum hydroxides, separating such precipitate from the solution, finely dividing said precipitate in water, adding thereto an equivalent amount of calcium hydroxide and sodium carbonate to form the corresponding aluminate, separating the solution of sodium aluminate from the insoluble residue formed, passing carbon dioxide through such solution until precipitation of the insoluble aluminum hydroxide substantially ceases, and then separating such aluminum hydroxide from the liquid.

10. The process of treating a vermiculite with sulphuric acid thereby producing substantially-pure silica in the form of flat plates or flakes in a solution containing principally ferrous and ferric sulphates, aluminum sulphate and magnesium sulphate, filtering out the silica, substantially neutralizing the solution with an alkaline base capable of producing an insoluble sulphate thereby causing a precipitation of iron and aluminum hydroxides, separating such precipitate from the solution, finely dividing said precipitate in boiling water, adding thereto an equivalent amount of calcium hydroxide and sodium carbonate to form the corresponding aluminate while stirring with air, separating the solution of sodium aluminate from the insoluble residue formed, passing carbon dioxide through such solution until precipitation of the insoluble aluminum hydroxide substantially ceases, and then separating such aluminum hydroxide from the liquid.

11. The process of treating a vermiculite with sulphuric acid thereby producing substantially-pure silica in the form of flat plates or flakes in a solution containing principally ferrous and ferric sulphates, aluminum sulphate and magnesium sulphate, filtering out the silica, substantially neutralizing the solution with finely-divided calcium oxide distributed in boiling water as a carrier while agitating the liquid with air thereby causing a precipitation of iron and aluminum hydroxides, separating such precipitate from the solution, finely dividing said precipitate in boiling water, adding thereto an equivalent amount of calcium hydroxide and sodium carbonate to form the corresponding aluminate while agitating the liquid with air, separating the solution of sodium aluminate from the insoluble residue formed, passing carbon dioxide through such solution until precipitation of the insoluble aluminum hydroxide substantially ceases, and then separating such aluminum hydroxide from the liquid.

12. The process of treating a vermiculite with sulphuric acid thereby producing substantially-pure silica in the form of flat plates or flakes in a solution containing principally ferrous and ferric sulphates, aluminum sulphate and magnesium sulphate, separating out the silica, substantially neutralizing the solution with an alkaline base capable of producing an insoluble sulphate thereby causing a precipitation of iron and aluminum hydroxides, separating such precipitate from the solution, finely dividing said precipitate in water, adding thereto an equivalent amount of an alkline hydroxide to form the corresponding aluminate, and separating the solution of aluminate from the insoluble residue formed.

In witness whereof we have hereunto set our hands.

ROBERT G. GUTHRIE.
OSCAR J. WILBOR.